(12) United States Patent
Lambert

(10) Patent No.: US 11,511,690 B2
(45) Date of Patent: Nov. 29, 2022

(54) ASSEMBLIES FOR MATING A RETENTION CLIP TO A BUMPER COVER AND METHODS OF USE THEREOF

(71) Applicant: TOYOTA MOTOR NORTH AMERICA, INC., Plano, TX (US)

(72) Inventor: Jeffrey D. Lambert, Celina, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 79 days.

(21) Appl. No.: 16/839,700

(22) Filed: Apr. 3, 2020

(65) Prior Publication Data
US 2021/0309173 A1 Oct. 7, 2021

(51) Int. Cl.
B60R 19/24 (2006.01)
F16B 19/00 (2006.01)

(52) U.S. Cl.
CPC ............ B60R 19/24 (2013.01); F16B 19/004 (2013.01)

(58) Field of Classification Search
CPC ......... B60R 19/24; B60R 19/44; B60R 19/52; B60R 2019/247; F16B 19/004
See application file for complete search history.

(56) References Cited

U.S. PATENT DOCUMENTS

| | | | |
|---|---|---|---|
| 4,176,428 A | 12/1979 | Kimura | |
| 5,226,695 A * | 7/1993 | Flint | B62D 29/048 293/121 |
| 6,010,169 A | 1/2000 | Cox et al. | |
| 6,769,727 B2 | 8/2004 | Delavalle et al. | |
| 7,001,128 B2 | 2/2006 | Kuntze | |
| 7,614,836 B2 | 11/2009 | Mohiuddin et al. | |
| 8,348,568 B2 | 1/2013 | Murakami | |
| 8,591,160 B2 | 11/2013 | Shinozaki | |
| 9,327,779 B1 * | 5/2016 | Wey | B62D 35/02 |
| 9,835,190 B2 | 12/2017 | Landsberg et al. | |
| 10,369,945 B2 | 8/2019 | Gruebl et al. | |
| 2013/0017033 A1 * | 1/2013 | Brown | F16B 43/02 411/112 |
| 2018/0119715 A1 | 5/2018 | Sakurai | |
| 2019/0322232 A1 * | 10/2019 | Yagame | B60R 19/24 |
| 2021/0024022 A1 * | 1/2021 | Matecki | B60R 19/34 |
| 2021/0309173 A1 * | 10/2021 | Lambert | B60R 19/24 |

FOREIGN PATENT DOCUMENTS

WO 2014109913 A1 7/2014

* cited by examiner

*Primary Examiner* — Gregory A Blankenship
(74) *Attorney, Agent, or Firm* — Dinsmore & Shohl LLP

(57) ABSTRACT

Embodiments described herein generally relate to an assembly for mating a retention clip to a bumper cover. The assembly includes a mating hole adapter including a body having a through hole of a first inner diameter. The assembly further includes a bumper cover including a through hole of a second inner diameter, where the first inner diameter of the through hole of the mating hole adapter is less than the second inner diameter of the through hole of the bumper cover. The assembly further includes a retention clip including a fastener having an outer diameter that is substantially equal to the first inner diameter, where the retention clip is mated with the bumper cover by the through hole of the mating hole adapter.

17 Claims, 4 Drawing Sheets

ASSEMBLIES FOR MATING A RETENTION CLIP TO A BUMPER COVER AND METHODS OF USE THEREOF

TECHNICAL FIELD

The present specification generally relates to assemblies and methods for mating components and, more specifically, assemblies and methods for mating components on a vehicle.

BACKGROUND

Some vehicle components, such as bumper covers, include through holes having a certain diameter. However, some equipment that may need to be mated to the vehicle component may have a through hole with a different size. Most commonly, reduction bushing or shimming may be used to reduce a diameter of a through hole. However, both reduction bushing and shimming include a number of parts that require assembly, thereby decreasing efficiency on a production line. Further, an installer must have a line of sight when using reduction bushing or shimming, thereby increasing the time it takes to properly install the equipment.

SUMMARY

In embodiments, an assembly for mating a retention clip to a bumper cover is provided. The assembly includes a mating hole adapter, a bumper cover, and a retention clip. The mating hole adapter includes a body having a through hole of a first inner diameter. The bumper cover includes a through hole of a second inner diameter, where the first inner diameter of the through hole of the mating hole adapter is less than the second inner diameter of the through hole of the bumper cover. The retention clip includes a fastener having an outer diameter that is substantially equal to the first inner diameter, where the retention clip is mated with the bumper cover by the through hole of the mating hole adapter.

In one or more embodiments, a method for mating a retention clip to a bumper cover is provided. The method includes placing a mating hole adapter onto a bumper cover, coordinating the through hole of the mating hole adapter with the through hole of the bumper cover, and mating a retention clip with the bumper cover by passing a fastener of the retention clip through both the through hole of the mating hole adapter and the through hole of the bumper cover. The mating hole adapter includes a body having a through hole of a first inner diameter and the bumper cover includes a through hole of a second inner diameter. The first inner diameter of the through hole of the mating hole adapter is less than the second inner diameter of the through hole of the bumper cover. The retention clip includes a fastener having an outer diameter that is substantially equal to the first inner diameter.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As used herein, the term "substantially equal" in connection with two or more described dimensions means that the equal relationship between the dimensions includes variations that, using mathematical and industrial principles accepted in the art (e.g., rounding, measurement or other systematic errors, manufacturing tolerances, etc.), would not vary more than the least significant digit of the dimensions.

As used herein, the term "substantially triangular" means that the shape is not a straight edge triangle but resembles a triangular shape and has at least two long edges that meet at a corner.

As used herein, the term "substantially planar parallelogram" means a sufficiently flat four-sided rectilinear figure object with opposite sides parallel to each other.

Figure 1:
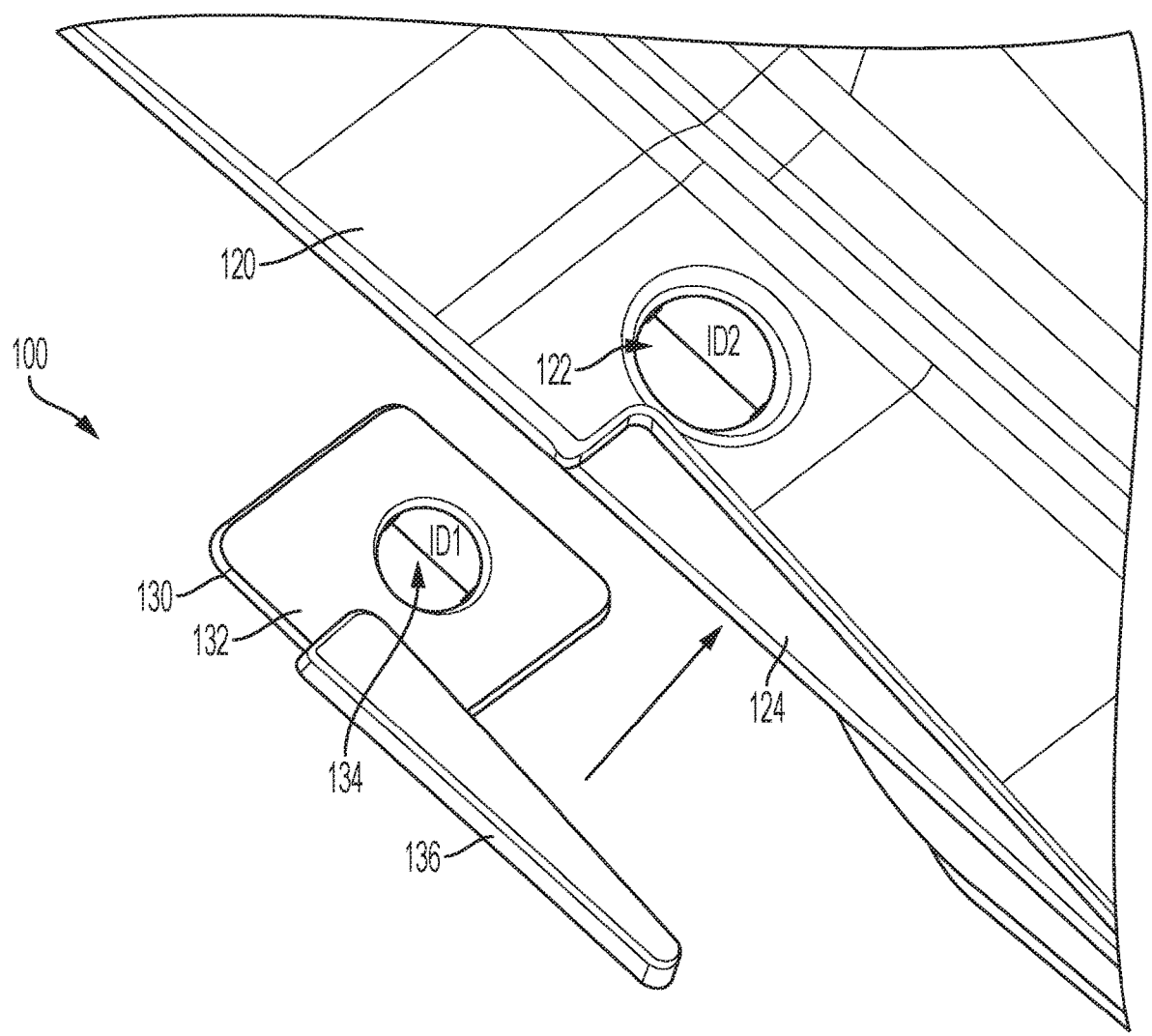
FIG. 1 schematically depicts a perspective view of a mating hole adapter and a bumper cover, according to one or more embodiments shown and described herein.
Figure 2:
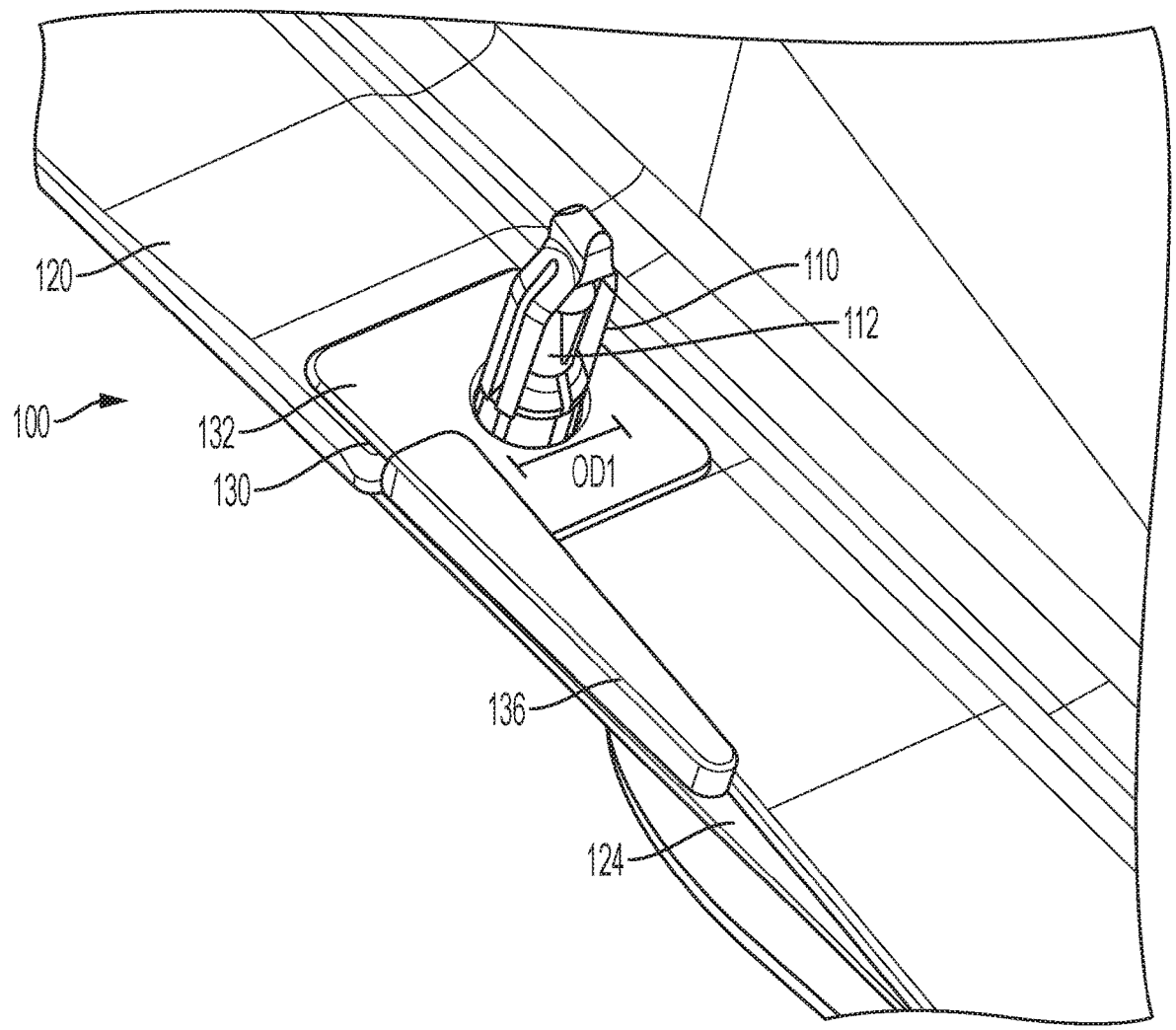
FIG. 2 schematically depicts a perspective view of an assembly for mating a retention clip to a bumper cover, according to one or more embodiments shown and described herein FIG. 3 schematically depicts a different perspective view of the assembly for mating a retention clip to a bumper cover of FIG. 2, according to one or more embodiments shown and described herein.
Figure 3:
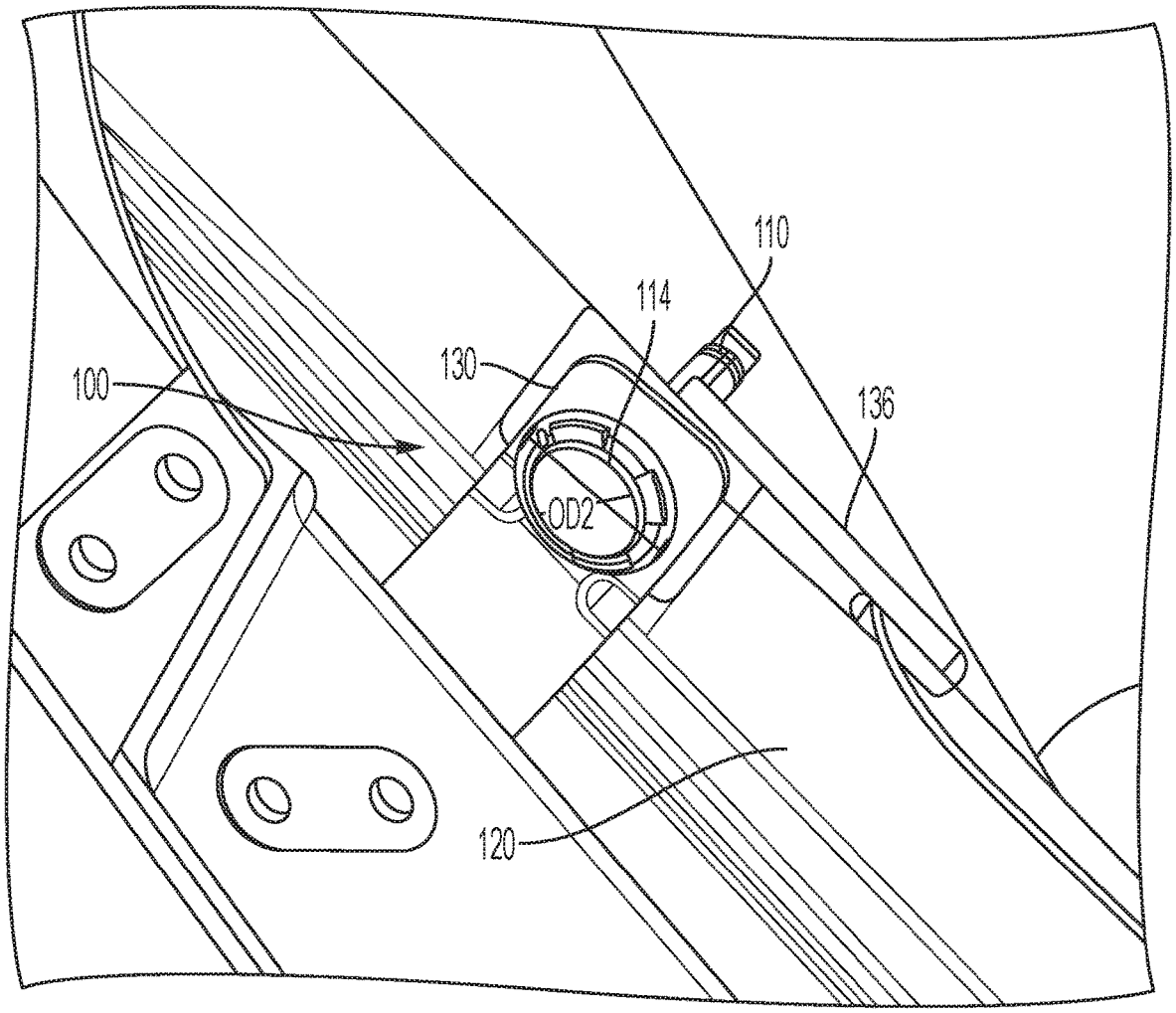
Figure 4:
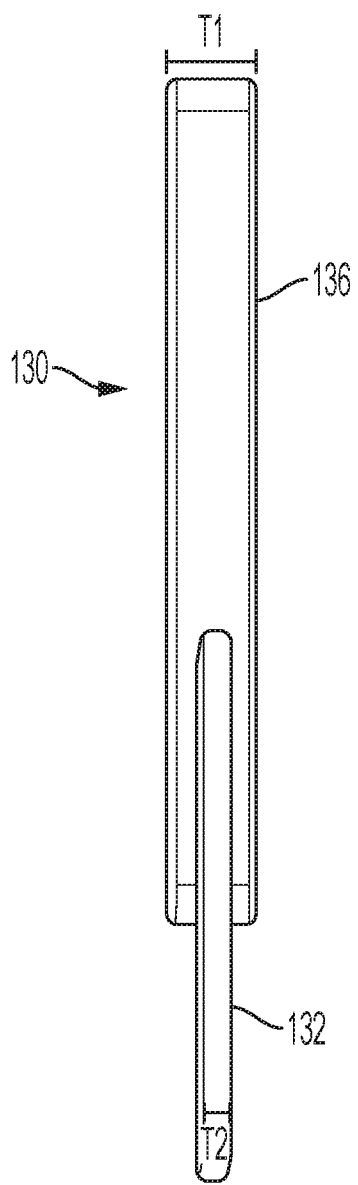
FIG. 4 schematically depicts a side view of a mating hole adapter, according to one or more embodiments shown and described herein.

Now referring to FIGS. 1-3, an assembly 100 for mating a retention clip 110 to a bumper cover 120 is provided. The assembly 100 may include a mating hole adapter 130, the bumper cover 120, and the retention clip 110. The mating hole adapter 130 may include a body 132 having a through hole 134 of a first inner diameter ID1. The bumper cover 120 may include a through hole 122 of a second inner diameter ID2. The first inner diameter ID1 of the through hole 134 of the mating hole adapter 130 may be less than the second inner diameter ID2 of the through hole 122 of the bumper cover 120. The retention clip 110 may include a fastener 112 having an outer diameter OD that is substantially equal to the first inner diameter ID1 of through hole 134. The retention clip 110 may be mated with the bumper cover 120 by the through hole 134 of the mating hole adapter 130. Therefore, the assembly 100 allows for the fastener 110 to be mated with the bumper cover 120 regardless of their respective sizes (e.g., diameters) as the mating hole adapter 130 reduces the diameter of through hole 122 to match the size (e.g., diameter) of one or more components of the fastener 110. Moreover, the assembly 100 may be installed with right-handed or left-handed installation.

In embodiments, the mating hole adapter 130 may further include a locator 136, which is attached to the body 132. The locator 136 may be configured to interface with an impression 124 on the bumper cover 120. This feature may allow for the mating hole adapter 130 to self-locate during installation of the assembly 100, thereby allowing an installer to fit the mating hole adapter 130 by feel alone. In other words, an installer may be able to install the assembly 100 such that through hole 122 lines up with through hole 134 without needing a direct line of sight to the retention clip 110, the bumper cover 120, or the mating hole adapter 130 during the installation process.

In embodiments, the locater 136 may be substantially triangular. This shape may allow for the mating hole adapter 130 to align with the impression 124, such as a pre-existing groove, that may be present on the bumper cover 120. In one or more embodiments, the locator 136 may have the shape of a square, a rectangle, a triangle, a circle, an oval, a trapezoid, a pentagon, a hexagon, a heptagon, an octagon, a nonagon, a decagon, and the like. The shape of the locator 136 may be determined by the shape of the impression 124 of the bumper cover 120 within which the locator 136 may be interfaced.

Referring now to FIG. 3, the locator 136 may a thickness T1 that is at least 2 times a thickness T2 of the body 132 of the mating hole adapter 130. In one or more embodiments, the thickness T1 of the locator 136 may be at least 2.25 times, 2.5 times, 2.75 times, 3 times, or 3.25 times the thickness T2 of the body 132 of the mating hole adapter 130. The difference in thicknesses of the body 132 and the locator 136 may allow for the mating hole adapter 130 to fit flush against the bumper cover 120 depending on the depth of the impression 124.

Referring again to FIG. 1, the body 132 of the mating hole adapter 130 may be a substantially planar parallelogram. However, in embodiments, the body 132 may have the shape of a square, a rectangle, a triangle, a circle, an oval, a trapezoid, a pentagon, a hexagon, a heptagon, an octagon, a nonagon, a decagon, and the like. The shape of the body 132 may be determined by the shape of the bumper cover 120 with which the body 132 may be interfaced.

Referring still to FIG. 1, the first inner diameter ID1 of through hole 134 may be any diameter value. As non-limiting examples, the first inner diameter ID1 of through hole 134 may be from 6 millimeters (mm) to less than 10 mm or any subrange therebetween, such as from 6.1 mm to less than 10 mm, from 6.2 mm to less than 10 mm, from 6.3 mm to less than 10 mm, from 6.4 mm to less than 10 mm, from 6.5 mm to less than 10 mm, from 6.6 mm to less than 10 mm, from 6.7 mm to less than 10 mm, from 6.8 mm to less than 10 mm, from 6.9 mm to less than 10 mm, from 7 mm to less than 10 mm, from 7.1 mm to less than 10 mm, from 7.2 mm to less than 10 mm, from 7.3 mm to less than 10 mm, from 7.4 mm to less than 10 mm, from 7.5 mm to less than 10 mm, from 7.6 mm to less than 10 mm, from 7.7 mm to less than 10 mm, from 7.8 mm to less than 10 mm, from 7.9 mm to less than 10 mm, from 6 mm to 9.9 mm, from 6 mm to 9.8 mm, from 6 mm to 9.7 mm, from 6 mm to 9.6 mm, from 6 mm to 9.5 mm, from 6 mm to 9.4 mm, from 6 mm to 9.3 mm, from 6 mm to 9.2 mm, from 6 mm to 9.1 mm, from 6 mm to 9 mm, from 6 mm to 8.9 mm, from 6 mm to 8.8 mm, from 6 mm to 8.7 mm, from 6 mm to 8.6 mm, from 6 mm to 8.5 mm, from 6 mm to 8.4 mm, from 6 mm to 8.3 mm, from 6 mm to 8.2 mm, from 6 mm to 8.1 mm, from 6.1 mm to 9.9 mm, from 6.2 mm to 9.8 mm, from 6.3 mm to 9.7 mm, from 6.4 mm to 9.6 mm, from 6.5 mm to 9.5 mm, from 6.6 mm to 9.4 mm, from 6.7 mm to 9.3 mm, from 6.8 mm to 9.2 mm, from 6.1 mm to 9.1 mm, from 7 mm to 9 mm, from 7.1 mm to 8.9 mm, from 7.2 mm to 8.8 mm, from 7.3 mm to 8.7 mm, from 7.4 mm to 8.6 mm, from 7.5 mm to 8.5 mm, from 7.6 mm to 8.4 mm, from 7.7 mm to 8.3 mm, from 7.8 mm to 8.2 mm, or from 7.9 mm to 8.1 mm.

The second inner diameter ID2 of through hole 122 may be any diameter value. As non-limiting examples, the second inner diameter ID2 of through hole 122 may be from 10 mm to 14 mm or any subrange therebetween, such as from 10.1 mm to 14 mm, from 10.2 mm to 14 mm, from 10.3 mm to 14 mm, from 10.4 mm to 14 mm, from 10.5 mm to 14 mm, from 10.6 mm to 14 mm, from 10.7 mm to 14 mm, from 10.8 mm to 14 mm, from 10.9 mm to 14 mm, from 11 mm to 14 mm, from 11.1 mm to 14 mm, from 11.2 mm to 14 mm, from 11.3 mm to 14 mm, from 11.4 mm to 14 mm, from 11.5 mm to 14 mm, from 11.6 mm to 14 mm, from 11.7 mm to 14 mm, from 11.8 mm to 14 mm, from 11.9 mm to 14 mm, from 10 mm to 13.9 mm, from 10 mm to 13.8 mm, from 10 mm to 13.7 mm, from 10 mm to 13.6 mm, from 10 mm to 13.5 mm, from 10 mm to 13.4 mm, from 10 mm to 13.3 mm, from 10 mm to 13.2 mm, from 10 mm to 13.1 mm, from 10 mm to 13 mm, from 10 mm to 12.9 mm, from 10 mm to 12.8 mm, from 10 mm to 12.7 mm, from 10 mm to 12.6 mm, from 10 mm to 12.5 mm, from 10 mm to 12.4 mm, from 10 mm to 12.3 mm, from 10 mm to 12.2 mm, from 10 mm to 12.1 mm, from 10.1 mm to 13.9 mm, from 10.2 mm to 13.8 mm, from 10.3 mm to 13.7 mm, from 10.4 mm to 13.6 mm, from 10.5 mm to 13.5 mm, from 10.6 mm to 13.4 mm, from 10.7 mm to 13.3 mm, from 10.8 mm to 13.2 mm, from 10.9 mm to 13.1 mm, from 11 mm to 13 mm, from 11.1 mm to 13.9 mm, from 11.2 mm to 13.8 mm, from 11.3 mm to 13.7 mm, from 11.4 mm to 13.6 mm, from 11.5 mm to 13.5 mm, from 11.6 mm to 13.4 mm, from 11.7 mm to 13.3 mm, from 11.8 mm to 13.2 mm, or from 11.9 mm to 13.1 mm.

Referring now to FIGS. 2A-2B, the retention clip 110 may further comprise a clip head 114 configured to receive the fastener 112. In embodiments, the fastener 112 may receive the clip head 114 through one or both of the mating hole adapter 130 and the bumper cover 120, so as to secure may secure the retention clip 110 to at least the bumper cover 120. In one or more embodiments, the clip head 114 may have an outer diameter OD2 that is greater than the outer diameter OD1 of the fastener 112. The clip head 114 with a greater outer diameter OD2 than the outer diameter OD1 of the fastener 112 may enhance a retention force of the retention clip 110.

The assembly 100 of any of the previously-described embodiments may be included in methods for mating a retention clip to a bumper cover. In one or more embodiments, a method for mating the retention clip 110 to the bumper cover 120 may include placing the mating hole adapter 130 onto the bumper cover 120, coordinating the through hole 134 of the mating hole adapter 130 with the through hole 122 of the bumper cover 120, and mating the retention clip 110 with the bumper cover 120 by passing the fastener 112 of the retention clip 110 through both through hole 134 and through hole 122. The method may further include securing the retention clip 110 to the bumper cover 120 with the clip head 114, which may be configured to receive the fastener 112 through the through hole 122 of the bumper cover 120.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An assembly for mating a retention clip to a bumper cover, comprising:
    a mating hole adapter comprising a body having a through hole of a first inner diameter, wherein the body is substantially planar;

a bumper cover comprising a through hole of a second inner diameter, wherein the first inner diameter of the through hole of the mating hole adapter is less than the second inner diameter of the through hole of the bumper cover; and a retention clip comprising a fastener having an outer diameter that is substantially equal to the first inner diameter, wherein the retention clip is mated with the bumper cover by the through hole of the mating hole adapter.

2. The assembly of claim 1, wherein the mating hole adapter further comprises a locator attached to the body, wherein the locator is configured to interface with an impression on the bumper cover.

3. The assembly of claim 2, wherein the locator is substantially triangular.

4. The assembly of claim 2, wherein the locator has a thickness that is at least 2 times a thickness of the body of the mating hole adapter.

5. The assembly of claim 1, wherein the body of the mating hole adapter is a parallelogram.

6. The assembly of claim 1, wherein the first inner diameter of the through hole of the mating hole adapter is from 6 millimeters (mm) to less than 10 mm.

7. The assembly of claim 6, wherein the second inner diameter of the through hole of the bumper cover is from 10 mm to 14 mm.

8. The assembly of claim 1, wherein the retention clip further comprises a clip head configured to receive the fastener.

9. The assembly of claim 8, wherein the clip head has a diameter that is greater than the outer diameter of the fastener.

10. A method for mating a retention clip to a bumper cover, the method comprising:

placing a mating hole adapter onto a bumper cover, wherein (a) the mating hole adapter comprises a body is substantially planar and has a through hole of a first inner diameter and (b) the bumper cover comprises a through hole of a second inner diameter;

coordinating the through hole of the mating hole adapter with the through hole of the bumper cover; and mating a retention clip with the bumper cover by passing a fastener of the retention clip through both the through hole of the mating hole adapter and the through hole of the bumper cover, wherein:

the first inner diameter of the through hole of the mating hole adapter is less than the second inner diameter of the through hole of the bumper cover, and the fastener has an outer diameter that is substantially equal to the first inner diameter of the through hole of the mating hole adapter.

11. The method of claim 10, further comprising securing the retention clip to the bumper cover with a clip head configured to receive the fastener through the through hole of the bumper cover.

12. The method of claim 10, wherein the mating hole adapter further comprises a locator attached to the body, wherein the locator is configured to interface with an impression on the bumper cover.

13. The method of claim 12, wherein the locator is substantially triangular.

14. The method of claim 12, wherein the locator has a thickness that is at least 2 times a thickness of the body of the mating hole adapter.

15. The method of claim 10, wherein the body of the mating hole adapter is a parallelogram.

16. The method of claim 10, wherein the first inner diameter of the through hole of the mating hole adapter is from 6 millimeters (mm) to less than 10 mm.

17. The method of claim 16, wherein the second inner diameter of the through hole of the bumper cover is from 10 mm to 14 mm.

\* \* \* \* \*